United States Patent Office 3,256,137
Patented June 14, 1966

3,256,137
ADHERING TEXTILE MATERIALS TO RUBBER
Arthur C. Danielson, Royal Oak, Mich., assignor to United States Rubber Company, New York, N.Y., a corporation of New Jersey
No Drawing. Filed July 10, 1963, Ser. No. 294,169
14 Claims. (Cl. 161—241)

This application is a continuation-in-part of my application Serial No. 129,228, filed August 4, 1961, and of my application Serial No. 196,434, filed May 21, 1962 which is a continuation-in-part of said application Serial No. 129,228.

This invention relates to improvements in the method of adhering textile materials to rubber, and to the improved laminates so obtained.

In certain rubber articles designed to withstand considerable stresses in use, the rubber is reinforced with plies of comparatively inextensible textile materials. Thus, rubber hose, belts and tires are commonly reinforced with filamentary textiles in the form of yarns, cords or fabric. In such articles, it is important that the plies of textile reinforcing material be firmly adhered to the rubber intermediate the textile plies and remain effectively adhered even after the article has been subjected to repeated varying strains in use, because any separation and relative movement of the rubber and textile parts leads to abrasion between these parts and consequent failure. In order to improve the adhesion of the textile material to the rubber intermediate the textile plies, it is common practice to first apply a deposit of rubber on the textile material, such as a tire cord fabric, by passing the textile material through a bath of an aqueous dispersion of rubber, such as a rubber latex composition, as in a so-called "solutioning" treatment, and drying. The rubber latex "solutioning" composition preferably contains a resin, e.g., a fusible partially reacted resorcinol-formaldehyde resin, such as a condensate of resorcinol and formaldehyde in the ratio of 1 mole of resorcinol to about 0.5 to 0.8 mole of formaldehyde, and formaldehyde or a formaldehyde-yielding agent which on subsequent heating as during vulcanization of the rubber intermediate the textile plies cures the fusible resin to an infusible state. According to one aspect of the present invention, there is obtained a further improvement in adhesion of the textile material to the rubber intermediate the textile plies in addition to that obtained by the latex "solutioning" treatment of the textile material.

In carrying out the present invention, adhesion of the textile material, which may be bare (so-called grey), or which may be latex "solutioned," to the rubber layers intermediate the textile plies is greatly improved by incorporating in the solid rubber intermediate the textile plies a 1-aza-3,7-dioxabicyclo[3.3.0]-octane, and resorcinol or other meta disubstituted benzene in which each of the substituents is an OH, $NH_2$ or $OCOCH_3$ radical (e.g. m-aminophenol, m-phenylenediamine, resorcinol monoacetate or resorcinol diacetate), or 1,5-naphthalenediol or a fusible partially reacted resorcinol-formaldehyde resin (condensate of resorcinol and formaldehyde in the ratio of one mole of resorcinol to about 0.5 to 0.8 mole of formaldehyde). Such fusible partially reacted resorcinol-formaldehyde resins and those used in the above-mentioned latex "solutioning" compositions may be prepared in known manner by heating a concentrated aqueous solution of the resorcinol and formaldehyde, with or without a catalyst such as oxalic acid. The Ball and Ring softening point (ASTM: E28–58T) of such fusible partially reacted resins will generally be from about 60° C. to 120° C. The 1-aza-3,7-dioxabicyclo-[3.3.0]octane and resorcinol, or partially reacted resorcinol-formaldehyde resin, or such other material, react on heating, as in the vulcanization of the rubber to form an infusible resin.

The 1-aza-3,7-dioxabicyclo[3.3.0]octanes that may be used are compounds having the general formula

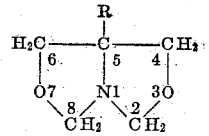

where R is hydrogen, methyl, ethyl, n-propyl, isopropyl, methylol, beta-hydroxyethyl, acetoxymethyl or methoxymethyl. These compounds are described in the paper "Some New Derivatives of Amino Hydroxy Compounds" by Murray Senkus, in Jour. Amer. Chem. Soc. 67 1515–1519 (1945) and in U.S. Patent No. 2,448,980 to William B. Johnston and, except where R is acetoxymethyl or methoxymethyl are made by the reaction of two moles of formaldehyde or paraformaldehyde with one mole of the selected 2-amino-1,3-propanediol. For example, 1-aza-3,7-dioxabicyclo[3.3.0]octane is made by reacting 1 mole of 2-amino-1,3-propanediol with 2 moles of paraformaldehyde; 1 - aza - 5 - methyl - 3,7 - dioxabicyclo [3.3.0]octane is made by reacting 1 mole of 2-amino-2 - methyl - 1,3 - propanediol with 2 mols of paraformaldehyde; 1 - aza - 5 - methylol - 3,7 - dioxabicyclo[3.3.0]octane is made by reacting 1 mole of 2-amino-2-methylol-1,3-propanediol with 2 moles of paraformaldehyde, etc. The 1 - aza - 5 - acetoxymethyl - 3,7-dioxabicyclo[3.3.0]octane is made by reacting 1-aza-5-methylol-3,7-dioxabicyclo[3.3.0]octane with acetic anhydride in the presence of pyridine. The 1-aza-5-methoxymethyl - 3,7 - dioxabicyclo[3.3.0]octane is made by reacting the 1 - aza - 5 - methylol - 3,7 - dioxabicyclo [3.3.0]octane with dimethyl sulfate in a strongly basic alkali-metal hydroxide solution.

The rubber intermediate the textile plies may be applied in the usual manner by calendering a coating of a solid vulcanizable rubber composition containing the resin-forming components of the invention, viz., the 1-aza-3,7-dioxabicyclo[3.3.0]octane is made by reacting 1 m-aminophenol, m-phenylenediamine, resorcinol monoaceate, resorcinol diacetate, 1,5-naphthalenediol, or condensate of resorcinol and formaldehyde (partially reacted resorcinol-formaldehyde resin), on the textile material, generally on both sides, e.g. as in the conventional coating of tire cord fabric with tire carcass stock. The resin-forming components of the invention may be mixed with the conventional compounding ingredients in the solid rubber in a Banbury mixer and the rubber composition then calendered on the textile material. After building the rubber-coated textile material into the finished article, e.g. a tire, the assembly is heated to vulcanize the rubber components thereof. The ratio of the two resin-forming components is not critical and generally will be from one-half to two moles of the 1-aza-3,7-dioxabicyclo[3.3.0]octane per mole of the resorcinol, or resorcinol-formaldehyde condensate or other resin component. The amount of the resin-forming components mixed with the rubber is not critical. Generally, 0.5 to 8 parts, and preferably 1 to 4 parts of the two resin-forming components (total) per 100 parts of the rubber will be mixed in the rubber compound to be calendered on the textile material. Where the textile material is passed through a rubber latex "solutioning" bath and dried, the deposit on the thus treated textile material will be in the range of 1 to 15 percent, preferably 2 to 10 percent, of latex solids based on the weight of the textile material.

The solid rubber used in the present invention for making the rubber and fabric laminates for use in tire manufacture and for other purposes may be natural (Hevea) rubber or conjugated diolefine polymer synthetic rubber or mixtures of any of them including their reclaims. The aqueous dispersion of rubber, when used for "solutioning" the textile material before plying with the solid rubber composition, may be natural rubber latex, or a latex of conjugated diolefine polymer synthetic rubber, or mixtures thereof, or an aqueous dispersion of reclaim from such rubbers, or mixtures of any such latices and reclaim dispersions. Such conjugated diolefine polymer synthetic rubbers are polymers of butadienes-1,3, e.g. butadiene-1,3, isoprene, 2,3-dimethyl-butadiene-1,3, and polymers of mixtures thereof and copolymers of mixtures of one or more such butadienes-1,3, with one or more other polymerizable compounds which are capable of forming rubbery copolymers with butadienes-1,3, for example, up to 60% by weight of such mixture of one or more monoethylenic compounds which contain a

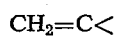

group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone. Examples of such conjugated diolefine polymer synthetic rubbers are polybutadiene, polyisoprene, butadiene-styrene copolymers (SBR) and butadiene-acrylonitrile copolymers. The rubber intermediate the plies will also contain conventional compounding and vulcanizing ingredients such as carbon black, rubber processing or softening oils which may be added as such or may be present from oil-extended rubbers, antioxidants, sulfur, zinc oxide and accelerators. The textile material may be any of the conventional textiles used for reinforcing rubber, such as native cellulose (e.g. cottons), regenerated cellulose (e.g. rayons) and synthetic linear polyamides (e.g. nylons), and may comprise cords or woven fabrics.

The following examples illustrate the invention. All parts and percentages referred to herein are by weight.

*Example 1*

A rubber compound A was prepared by milling 1.25 parts of resorcinol into a masterbatch of 100 parts of natural rubber and 20 parts of carbon black at about 110° C. After cooling, the following ingredients were mixed into the batch at about 70° C. in the following order: 10 parts of zinc oxide, 2 parts of stearic acid, 0.5 part of accelerator SNS (N-tertiary-butyl-2-benzothiazole-sulfenamide), 1 part of antioxidant BLE (condensation product of acetone and diphenylamine), 1.6 parts of 1 - aza - 5 - methyl-3,7-dioxabicyclo[3.3.0]octane, and 3.5 parts of sulfur.

A rubber compound B was prepared in a similar manner to compound A except 1.8 parts of 1-aza-5-ethyl-3,7-dioxabicyclo[3.3.0]octane was added instead of the 1-aza-5-methyl-3,7-dioxabicyclo[3.3.0]octane.

A rubber compound C was prepared in a similar manner to compound A except 1.8 parts of 1-aza-5-methylol-3,7-dioxabicyclo[3.3.0]octane was added instead of the 1 - aza - 5 - methyl - 3,7 - dioxabicyclo[3.3.0]octane was omitted.

A control rubber compound D was prepared in a similar manner to compound A except the resorcinol and 1-aza-5-methyl-3,7-dioxabicyclo[3.3.0]octane was omitted.

The adhesion of rubber compounds A to D to untreated (grey) tire cords made of rayon and nylon fibres and of rubber compounds C and D to solutioned tire cords made of rayon and nylon fibres was measured at 250° F. by the "H" adhesion test described in Ind. Rub. World, vol. 114, page 213 (1946) "Study of the 'H' Test for Evaluating the Adhesive Properties of Tire Cord in Natural and GR-S Rubbers," and in United States Department of Agriculture, Bulletin A1C-99 (1945) by Lyons, Nelson and Conrad. The solutioned rayon and nylon cords were passed through a conventional latex "solutioning" bath, and dried. The "solutioning" bath used on rayon cords in this and the following examples consisted of 80 parts solids of a copolymer of 50 parts of butadiene and 50 parts of styrene, 20 parts solids of a latex of a terpolymer of 70 parts of butadiene and 15 parts of vinyl pyridine and 15 parts of styrene, 8 parts of a commercial partially reacted resorcinol-formaldehyde resin (ratio of 1 mole of resorcinol to about 0.6 to 0.8 mole of formaldehyde) having a Ball and Ring softening point of about 110° C., 0.5 part of ammonia and 2 parts of formaldehyde, at a 15–20% concentration. The "solutioning" bath used on nylon cords in this and the following examples comprised 100 parts solids of a latex of a copolymer of 70 parts of butadiene and 15 parts of vinyl pyridine and 15 parts of styrene, 15 parts of a commercial partially reacted resorcinol-formaldehyde resin (ratio of 1 mole of resorcinol to about 0.6 to 0.8 mole of formaldehyde) having a Ball and Ring softening point of about 110° C., 0.9 part of ammonia and 4.25 parts of formaldehyde, at a 15–20% concentration. These are conventional co-called latex cord dipping compounds. In the "H" test, the cord under test coated with the rubber compound under test is embedded in two separated standard rubber blocks and the assembly vulcanized. The pounds necessary to pull the adhered cord free of one of the rubber blocks is the "H" adhesion value. The higher the figure, the better the adhesion of the rubber coating to the cord. Test pieces for the rubber compounds A to D were vulcanized for 30 minutes at 307° F. The results are shown in the following table:

| Cord | 250° F. "H" Adhesion (lbs.) | | | |
|---|---|---|---|---|
| | A | B | C | D |
| Grey Rayon | 9.0 | 12.3 | 10.3 | 3.0 |
| Grey Nylon | 8.0 | 9.0 | 8.9 | 4.7 |
| Solutioned Rayon | | | 12.1 | 7.7 |
| Solutioned Nylon | | | 14.7 | 11.8 |

Comparing the "H" adhesion values of compounds A, B and C with compound D clearly shows the great improvement in adhesion of fibrous material to rubber by the present invention.

In another test on grey nylon cord with the rubber recipe of the above compound D as a control, "H" adhesion value was 3.0 lbs. whereas the same rubber compound containing 1.25 parts of resorcinol and 1 part of 1-aza-3,7-dioxabicyclo[3.3.0]octane gave an "H" adhesion value of 10.1 lbs.

*Example 2*

A rubber compound was prepared by mixing 100 parts of natural rubber, 28 parts of carbon black, 1.8 parts of 1,5-naphthalenediol, 18 parts of zinc oxide, 2 parts of stearic acid, 3 parts of pine tar softener, 1.5 parts of antioxidant BLE (condensation product of acetone and diphenylamine), 0.4 part of accelerator SNS (N-tertiary-butyl-2-benzothiazole-sulfenamide), 1.8 parts of 1-aza-5-methylol-3,7-dioxabicyclo[3.3.0]octane, and 3.5 parts of sulfur.

A control rubber compound was prepared in a similar manner to the above rubber compound except the 1,5-naphthalenediol and the 1-aza-5-methylol-3,7-dioxabicyclo[3.3.0]octane were omitted.

The adhesion of the rubber compound containing the 1-aza-5-methylol-3,7-dioxabicyclo[3.3.0]octane and 1,5-naphthalenediol according to the present invention and the control compound to grey tire cords made of rayon and nylon fibers was measured at 250° F. by the "H" adhesion test. The test pieces were vulcanized for 30 minutes at 307° F. The results are shown in the following table:

|  | 250° F. "H" Adhesion (lbs.) | |
|---|---|---|
|  | Grey Rayon | Grey Nylon |
| Present Invention | 13.1 | 10.4 |
| Control | 3.2 | 3.8 |

Example 3

A rubber compound was prepared by mixing 100 parts of natural rubber, 33 parts of carbon black, 1.25 parts of resorcinol, 10 parts of zinc oxide, 2 parts of stearic acid, 5 parts of pine tar softener, 1.5 parts of antioxidant BLE (condensation product of acetone and diphenylamine), 0.4 part of accelerator SNS (N-tertiary-butyl-2-benzothiazole-sulfenamide), 2 parts of 1-aza-5-acetoxymethyl-3,7-dioxabicyclo[3.3.0]octane, and 3.5 parts of sulfur.

A control rubber compound was prepared in a similar manner to the above rubber compound except the resorcinol and the 1-aza-5-acetoxymethyl-3,7-dioxabicyclo[3.3.0]octane were omitted.

The 1-aza-5-acetoxymethyl-3,7-dioxabicyclo[3.3.0]octane was prepared as follows: To 43.5 grams of 1-aza-5-methylol-3,7-dioxabicyclo[3.3.0]octane in a 250 ml. round bottom flask was added 30 ml. of acetic anhydride and 26 ml. of pyridine. The solution was refluxed for two hours. After cooling the flask in cold water, the crystalline mass was filtered on a Büchner funnel and washed six times with cold methanol. The yield of white crystals of 1-aza-5-acetoxymethyl-3,7-dioxabicyclo[3.3.0]octane was 43 grams (melting at 98° C.). Analysis: Calculated for N=7.49%. Found N=7.28%.

The adhesion of the rubber compound containing the 1-aza-5-acetoxymethyl-3,7-dioxabicyclo[3.3.0]octane and resorcinol according to the present invention and the control compound to grey tire cords made of rayon and nylon fibers and to solutioned tire cords made of rayon and nylon fibers was measured at 250° F. by the "H" adhesion test. The test pieces were vulcanized for 30 minutes at 307° F. The results are shown in the following table:

|  | 250° F. "H" Adhesion (lbs.) | | | |
|---|---|---|---|---|
|  | Grey | | Solutioned | |
|  | Rayon | Nylon | Rayon | Nylon |
| Present invention | 14.1 | 15.7 | 16.3 | 16.2 |
| Control | 2.3 | 4.4 | 7.2 | 9.7 |

Example 4

A rubber compound A was prepared by mixing 100 parts of natural rubber, 33 parts of carbon black, 1.25 parts of m-phenylenediamine, 10 parts of zinc oxide, 2 parts of stearic acid, 5 parts of pine tar softener, 1.5 parts of antioxidant BLE (condensation product of acetone and diphenylamine), 0.4 part of accelerator SNS (N-tertiary-butyl-2-benzothiazolesulfenamide), 1.6 parts of 1-aza-5-methylol-3,7-dioxabicyclo[3.3.0]octane, and 3.5 parts of sulfur.

A rubber compound B was prepared in a similar manner to compound A except 1.0 part of 1-aza-5-ethyl-3,7-dioxabicyclo[3.3.0]octane was added instead of the 1-aza-5-methyl-3,7-dioxabicyclo[3.3.0]octane resin.

A rubber compound C was prepared in a similar manner to compound A except 1.8 parts of 1,5-naphthalenediol was added instead of the m-phenylendiamine and 1.8 parts of 1-aza-5-methylol-3,7-dioxabicyclo[3.3.0]octane was added instead of the 1-aza-5-methyl-3,7-dioxabicyclo[3.3.0]octane.

A rubber compound D was prepared in a similar manner to compound A except 1.25 parts of a commercial fusible partially reacted resorcinol-formaldehyde resin (ratio of 1 mole of resorcinol to about 0.6 to 0.8 mole of formaldehyde) having a Ball and Ring softening point of about 70° C., was added instead of the m-phenylenediamine, and 1.8 parts of 1-aza-5-methylol-3,7-dioxabicyclo[3.3.0]octane was added instead of the 1-aza-5-methyl-3,7-dioxabicyclo[3.3.0]octane.

A control rubber compound E was prepared in a similar manner to compound A except the m-phenylenediamine and 1-aza-5-methyl-3,7-dioxabicyclo[3.3.0]octane were omitted.

The adhesion of the rubber compounds A to E to grey tire cords made of rayon and nylon fibers and of compounds C, D and E to solutioned tire cords made of rayon and nylon fibers was measured at 250° F. by the "H" adhesion test. Test pieces for the rubber compounds A to E were vulcanized for 30 minutes at 307° C. The results are shown in the following table:

| Cord | 250° F. "H" Adhesion (lbs.) | | | | |
|---|---|---|---|---|---|
|  | A | B | C | D | E |
| Grey Rayon | 7.3 | 9.6 | 13.1 | 8.9 | 3.2 |
| Grey Nylon | 7.4 | 10.7 | 10.4 | 10.0 | 3.8 |
| Solutioned Rayon |  |  | 12.9 | 12.4 | 8.1 |
| Solutioned Nylon |  |  | 17.1 | 14.2 | 13.8 |

Example 5

A rubber compound A was prepared by mixing 100 parts of natural rubber, 33 parts of carbon black, 1.25 parts of m-aminophenol, 10 parts of zinc oxide, 2 parts of stearic acid, 5 parts of pine tar softener, 1.5 parts of antioxidant BLE (condensation product of acetone and diphenylamine), 0.4 part of accelerator SNS (N-tertiary-butyl-2-benzothiozolesulfenamide), 1.8 parts of 1-aza-5-methylol-3,7-dioxabicyclo[3.3.0]octane, and 3.5 parts of sulfur.

A rubber compound B was prepared in a similar manner to compound A except 1.73 parts of resorcinol monoacetate was added instead of the m-aminophenol.

A control rubber compound C was prepared in a similar manner to compound A except the m-aminophenol and 1-aza-5-methylol-3,7-dioxabicyclo[3.3.0]octane were omitted.

The adhesion of the rubber compounds A to C to grey tire cords made of rayon and nylon fibers and of compounds B and C to solutioned tire cords made of rayon and nylon fibers was measured at 250° F. by the "H" adhesion test. Test pieces for the rubber compounds A to C were vulcanized for 30 minutes at 307° F. The results are shown in the following table:

| Cord | 250° F. "H" Adhesion (lbs.) | | |
|---|---|---|---|
|  | A | B | C |
| Grey Rayon | 4.1 | 14.7 | 2.1 |
| Grey Nylon | 4.7 | 16.5 | 3.1 |
| Solutioned Rayon |  | 15.4 | 7.2 |
| Solutioned Nylon |  | 17.0 | 9.7 |

Example 6

A rubber compound A was prepared by mixing 68 parts of oil extended SBR (containing 18 parts of oil and 50 parts of a copolymer of about 77 parts of butadiene and 23 parts of styrene), 50 parts of natural rubber, 25 parts of whole tire reclaimed rubber of about 50% rubber content, 50 parts of carbon black, 1.7 parts of a commercial fusible partially reacted resorcinol-formaldehyde resin (ratio of 1 mole of resorcinol to about 0.6 to 0.8 mole of formaldehyde) having a Ball and Ring softening point of about 110° C., 1.5 parts of stearic acid, 10 parts of zinc oxide, 1.0 parts of non-staining antioxidant Naugawhite (alkylated bis phenol), 4.0 parts of pine tar oil, 0.85 part of eccelerator CBS (N-cyclohexyl-2-benzothiazolesulfenamide), 0.15 part of diphenyguanidine, 2.4 parts of 1-aza-5-methylol-3,7-dioxabicyclo[3.3.0]octane, and 3.5 parts of sulfur.

A control compound B was prepared in a similar manner to compound A except the resorcinol-formaldehyde resin and 1-aza-5-methylol-3,7-dioxabicyclo[3.3.0]octane were omitted.

The adhesion of the rubber compounds A and B to grey tire cords made of rayon and nylon fibers and to solutioned tire cords made of rayon and nylon fibers was measured at 250° F. by the "H" adhesion test. The test pieces were vulcanized for 30 minutes at 307° F. The results are shown in the following table:

| Cord | 250° F. "H" Adhesion (lbs.) | |
|---|---|---|
| | A | B |
| Grey Rayon | 5.1 | 2.2 |
| Grey Nylon | 4.2 | 2.8 |
| Solutioned Rayon | 14.3 | 12.5 |
| Solutioned Nylon | 9.3 | 8.3 |

*Example 7*

A rubber compound A was prepared by mixing 68 parts of oil extended SBR (containing 18 parts of oil and 50 parts of a copolymer of about 77 parts of butadiene and 23 parts of styrene), 50 parts of natural rubber, 50 parts of carbon black, 2 parts of a commercial fusible partially reacted resorcinol-formaldehyde resin (ratio of 1 mole of resorcinol to about 0.6 to 0.8 mole of formaldehyde) having a Ball and Ring softening point of about 100° C., 10.0 parts of zinc oxide, 1.5 parts of stearic acid, 1.0 parts of non-staining antioxidant Naugawhite (alkylated bis phenol), 1 part of hydrogenated pine tar, 0.7 part of accelerator CBS (N-cyclohexyl-2-benzothiazolesulfenamide), 0.1 part of diphenylguanidine, 1.0 parts of 1-aza-5-methylol-3,7-dioxabicyclo[3.3.0]octane, and 3.0 parts of sulfur.

A control rubber compound B was prepared in a similar manner to compound A except the resorcinol-formaldehyde resin and 1-aza-5-methylol-3,7-dioxabicyclo[3.3.0]octane were omitted.

The adhesion of the rubber compounds A and B to grey tire cords made of rayon and nylon fibers and to solutioned tire cords made of rayon and nylon fibers was measured at 250° F. by the "H" adhesion test. The test pieces were vulcanized for 30 minutes at 307° F. The results are shown in the following table:

| Cord | 250° F. "H" Adhesion (lbs.) | |
|---|---|---|
| | A | B |
| Grey Rayon | 13.1 | 1.2 |
| Grey Nylon | 10.8 | 2.9 |
| Solutioned Rayon | 16.7 | 9.0 |
| Solutioned Nylon | 18.5 | 14.1 |

*Example 8*

A rubber compound A was prepared by mixing 72 parts of natural rubber, 28 parts of cis-1,4-polybutadiene 25 parts of carbon black, 1.25 parts of a commercial fusible partially reacted resorcinol-formaldehyde resin (ratio of 1 mole of resorcinol to about 0.6 to 0.8 mole of formaldehyde) having a Ball and Ring softening point of about 100° C., 1.5 parts of zinc oxide, 1.5 parts of stearic acid, 5 parts of pine tar oil, 2.5 parts of antioxidant BLE (condensation product of acetone and diphenylamine), 0.25 part of antioxidant JZF (N,N'-diphenyl-p-phenylenediamine), 0.8 part of accelerator NOBS (N-oxydiethylene-2-benzothiazolesulfenamide), 1.0 parts of 1-aza-5-methylol-3,7-dioxabicyclo[3.3.0]octane, and 3.0 parts of sulfur.

A control rubber compound B was prepared in a similar manner to compound A except the resorcinol-formaldehyde resin and 1-aza-5-methylol-3,7-dioxabicyclo[3.3.0]octane were omitted.

The adhesion of the rubber compounds A and B to grey tire cords made of rayon and nylon fibers and to solutioned tire cords made of rayon and nylon fibers was measured at 250° F. by the "H" adhesion test. The test pieces were vulcanized for 30 minutes at 307° F. The results are shown in the following table:

| Cord | 250° F. "H" Adhesion (lbs.) | |
|---|---|---|
| | A | B |
| Grey Rayon | 7.5 | 2.6 |
| Grey Nylon | 5.7 | 3.8 |
| Solutioned Rayon | 10.9 | 8.9 |
| Solutioned Nylon | 15.0 | 13.7 |

*Example 9*

A rubber compound A was prepared by mixing 100 parts of natural rubber, 33 parts of carbon black, 1.25 parts of resorcinol, 10 parts of zinc oxide, 2 parts of stearic acid, 5 parts of pine tar softener, 1.5 parts of antioxidant BLE (condensation product of acetone and diphenylamine), 0.4 part of accelerator SNS (N-tertiary-butyl-2-benzothiazolesulfenamide), 1.8 parts of 1-aza-5-methoxymethyl-3,7-dioxabicyclo[3.3.0]octane, and 3.5 parts of sulfur.

The 1-aza-5-methoxymethyl-3,7-dioxabicyclo[3.3.0]octane was prepared as follows: To a solution of 145 grams of 1-aza-5-methylol-3,7-dioxabicyclo[3.3.0]octane in 150 ml. of water was added 200 grams of a 40% aqueous solution of sodium hydroxide, and 100 ml. of dimethylsulfate was added dropwise. The solution was allowed to stand overnight, filtered through a cotton plug and extracted with a total of 1 pound of diethylether in 100 ml. fractions. Evaporation of the ether left 36 grams of liquid 1-aza-5-methoxymethyl-3,7-dioxabicyclo[3.3.0]octane (boiling at 215–220° C.;

$$N_D^{27} = 1.4590)$$

Analysis: Calculated for N=8.8%. Found N=8.7%.

A control rubber compound B was prepared in a similar manner to compound A except the resorcinol and 1-aza-5-methoxymethyl-3,7-dioxabicyclo[3.3.0]octane were omitted.

The adhesion of the rubber compounds A and B to grey tire cords made of rayon and nylon fibers and to solutioned cords made of rayon and nylon fibers was measured at 250° F. by the "H" adhesion test. The test pieces were vulcanized for 30 minutes at 307° F. The results are shown in the following table:

| Cord | 250° F. "H" Adhesion (lbs.) | |
|---|---|---|
| | A | B |
| Grey Rayon | 16.2 | 2.6 |
| Grey Nylon | 16.2 | 3.7 |
| Solutioned Rayon | 16.0 | 7.3 |
| Solutioned Nylon | 15.7 | 10.9 |

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the method of laminating textile material and rubber by applying a solid vulcanizable rubber composition to a textile material and heating the assembly to vulcanize the rubber, the step which comprises incorporating in the rubber before vulcanization a compound selected from the group consisting of 1-aza-3,7-dioxabicyclo[3.3.0]octane,
1-aza-5-methyl-3,7-dioxabicyclo[3.3.0]octane,
1-aza-5-ethyl-3,7-dioxabicyclo[3.3.0]octane,
1-aza-5-n-propyl-3,7-dioxabicyclo[3.3.0]octane,
1-aza-5-isopropyl-3,7-dioxabicyclo[3.3.0]octane,
1-aza-5-methylol-3,7-dioxabicyclo[3.3.0]octane,
1-aza-5-beta-hydroxyethyl-3,7 - dioxabicyclo[3.3.0]octane,
1-aza-5-acetoxymethyl-3,7-dioxabicyclo[3.3.0]octane and
1-aza-5-methoxymethyl-3,7-dioxabicyclo[3.3.0]octane, and material selected from the group consisting of resorcinol, m-aminophenol, m-phenylenediamine, resorcinol monoacetate, resorcinol diacetate, 1,5-naphthalene-diol and partially reacted resorcinol-formaldehyde resins.

2. In the method of laminating textile material and rubber by applying a solid vulcanizable rubber composition to textile material containing the dried deposit of a rubber latex treating bath and heating the assembly to vulcanize the rubber, the step which comprises incorporating in the rubber before vulcanization a compound selected from the group consisting of 1-aza-3,7-dioxabicyclo[3.3.0]octane,
1-aza-5-methyl-3,7-dioxabicyclo[3.3.0]octane,
1-aza-5-ethyl-3,7-dioxabicyclo[3.3.0]octane,
1-aza-5-n-propyl-3,7-dioxabicyclo[3.3.0]octane,
1-aza-5-isopropyl-3,7-dioxabicyclo[3.3.0]octane,
1-aza-5-methylol-3,7-dioxabicyclo[3.3.0]octane,
1-aza-5-beta-hydroxyethyl-3,7 - dioxabicyclo[3.3.0]octane,
1-aza-5-acetoxymethyl-3,7-dioxabicyclo[3.3.0]octane and
1-aza-5-methoxymethyl-3,7-dioxabicyclo[3.3.0]octane, and material selected from the group consisting of resorcinol, m-aminophenol, m-phenylenediamine, resorcinol monoacetate, resorcinol diacetate, 1,5-naphthalenediol and partially reacted resorcinol-formaldehyde resins.

3. In the method of laminating textile material and rubber by applying a solid vulcanizable rubber composition to a textile material and heating the assembly to vulcanize the rubber, the step which comprises incorporating in the rubber before vulcanization 1-aza-5-methylol-3,7-dioxabicyclo[3.3.0]octane and a partially reacted resorcinol-formaldehyde resin.

4. A method of adhering textile material to rubber which comprises applying a solid vulcanizable rubber composition comprising rubber selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with compounds which contain a $CH_2=C<$ group and which are copolymerizable with butadienes-1,3- said rubber composition containing a compound selected from the group consisting of 1-aza-3,7-dioxabicyclo[3.3.0]octane,
1-aza-5-methyl-3,7-dioxabicyclo[3.3.0]octane,
1-aza-5-ethyl-3,7-dioxabicyclo[3.3.0]octane,
1-aza-5-n-propyl-3,7-dioxabicyclo[3.3.0]octane,
1-aza-5-isopropyl-3,7-dioxabicyclo[3.3.0]octane,
1-aza-5-methylol-3,7-dioxabicyclo[3.3.0]octane,
1-aza-5-beta-hydroxyethyl-3,7-dioxabicyclo[3.3.0]octane,
1-aza-5-acetoxymethyl-3,7-dioxabicyclo[3.3.0]octane and
1-aza-5-methoxymethyl-3,7-dioxabicyclo[3.3.0]octane, and material selected from the group consisting of resorcinol, m-aminophenol, m-phenylenediamine, resorcinol monoacetate, resorcinol diacetate, 1,5-naphthalenediol and partially reacted resorcinol-formaldehyde resins, to a textile material selected from the group consisting of cotton, rayon and nylon to coat the same, and heating the assembly to vulcanize the rubber and to firmly adhere the textile material to the vulcanized rubber composition.

5. A method of adhering textile material to rubber which comprises passing the textile material through a bath of an aqueous dispersion of rubber and drying, applying a solid vulcanizable rubber composition to the thus treated textile material, the rubber in said aqueous dispersion and in said solid rubber composition being selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes - 1,3 with compounds which contain a $CH_2=C<$ group and which are copolymerizable with butadienes-1,3, said solid rubber composition containing a compound selected from the group consisting of 1-aza-3,7-dioxabicyclo[3.3.0]octane,
1-aza-5-methyl-3,7-dioxabicyclo[3.3.0]octane,
1-aza-5-ethyl-3,7-dioxabicyclo[3.3.0]octane,
1-aza-5-n-propyl-3,7-dioxabicyclo[3.3.0]octane,
1-aza-5-isopropyl-3,7-dioxabicyclo[3.3.0]octane,
1-aza-5-methylol-3,7-dioxabicyclo[3.3.0]octane,
1-aza-5-beta-hydroxyethyl-3,7-dioxabicyclo[3.3.0]octane,
1-aza-5-acetoxymethyl-3,7-dioxabicyclo[3.3.0]octane and
1-aza-5-methoxymethyl-3,7-dioxabicyclo[3.3.0]octane, and material selected from the group consisting of resorcinol, m-aminophenol, m-phenylenediamine, resorcinol monoacetate, resorcinol diacetate, 1,5-naphthalenediol and partially reacted resorcinol-formaldehyde resins, said textile material being selected from the group consisting of cotton, rayon and nylon to coat the same, and heating the assembly to vulcanize the rubber and to firmly adhere the textile material to the vulcanized rubber composition.

6. A method of adhering tire cord fabric to a tire carcass stock which comprises calendering on tire cord fabric containing the dried deposit of a rubber latex treating bath a vulcanizable rubber tire carcass stock containing a compound selected from the group consisting of 1-aza-3,7-dioxabicyclo[3.3.0]octane,
1-aza-5-methyl-3,7-dioxabicyclo[3.3.0]octane,
1-aza-5-ethyl-3,7-dioxabicyclo[3.3.0]octane,
1-aza-5-n-propyl-3,7-dioxabicyclo[3.3.0]octane,
1-aza-5-isopropyl-3,7-dioxabicyclo[3.3.0]octane,
1-aza-5-methylol-3,7-dioxabicyclo[3.3.0]octane,
1-aza-5-beta-hydroxyethyl-3,7-dioxabicyclo[3.3.0]octane,
1-aza-5-acetoxymethyl-3,7-dioxabicyclo[3.3.0]octane and
1-aza-5-methoxymethyl-3,7-dioxabicyclo[3.3.0]octane, and material selected from the group consisting of resorcinol, m-aminophenol, m-phenylenediamine, resorcinol monoacetate, resorcinol diacetate, 1,5-naphthalenediol and partially reacted resorcinol-formaldehyde resins and subsequently heating to vulcanize the rubber and to firmly adhere the tire cord fabric to the vulcanized tire carcass stock.

7. A method of adhering tire cord fabric to a tire carcass stock which comprises calendering on tire cord fabric containing the dried deposit of a rubber latex treating bath a vulcanizable rubber tire carcass stock containing 1-aza-5-methylol - 3,7 - dioxabicyclo[3.3.0]-octane and a partially reacted resorcinol-formaldehyde resin, and subsequently heating to vulcanize the rubber and to firmly adhere the tire cord fabric to the vulcanized tire carcass stock.

8. A laminate of textile material and a calendered vulcanized rubber composition containing the resinous reaction product of a compound selected from the group consisting of 1-aza-3,7-dioxabicyclo[3.3.0]octane,
1-aza-5-methyl-3,7-dioxabicyclo[3.3.0]octane,
1-aza-5-ethyl-3,7-dioxabicyclo[3.3.0]octane,
1-aza-5-n-propyl-3,7-dioxabicyclo[3.3.0]octane,
1-aza-5-isopropyl-3,7-dioxabicyclo[3.3.0]octane,
1-aza-5-methylol-3,7-dioxabicyclo[3.3.0]octane,
1-aza-5-beta-hydroxyethyl-3,7-dioxabicyclo[3.3.0]-octane,
1-aza-5-acetoxymethyl-3,7-dioxabicyclo[3.3.0]octane and
1-aza-5-methoxymethyl-3,7-dioxabicyclo[3.3.0]octane, and material selected from the group consisting of resorcinol, m-aminophenol, m-phenylenediamine, resorcinol monoacetate, resorcinol diacetate, 1,5-naphthalenediol and partially reacted resorcinol-formaldehyde resins.

9. A laminate of textile material and a calendered vulcanized rubber composition containing the resinous reaction product of 1-aza-5-methylol-3,7-dioxabicyclo[3.3.0]octane and a partially reacted resorcinol-formaldehyde resin.

10. A laminate of tire cord fabric and a vulcanized rubber tire carcass stock containing the resinous reaction product of a compound selected from the group consisting of 1-aza-3,7-dioxabicyclo[3.3.0]octane,
1-aza-5-methyl-3,7-dioxabicyclo[3.3.0]octane,
1-aza-5-ethyl-3,7-dioxabicyclo[3.3.0]octane,
1-aza-5-n-propyl-3,7-dioxabicyclo[3.3.0]octane,
1-aza-5-isopropyl-3,7-dioxabicyclo[3.3.0]octane,
1-aza-5-methylol-3,7-dioxabicyclo[3.3.0]octane,
1-aza-5-beta-hydroxyethyl-3,7-dioxabicyclo[3.3.0]-octane,
1-aza-5-acetoxymethyl-3,7-dioxabicyclo[3.3.0]octane and
1-aza-5-methoxymethyl-3,7-dioxabicyclo[3.3.0]octane, and material selected from the group consisting of resorcinol, m-aminophenol, m-phenylenediamine, resorcinol monoacetate, resorcinol diacetate, 1,5-naphthalenediol and partially reacted resorcinol-formaldehyde resins.

11. A laminate of tire cord fabric containing the dried deposit of a rubber latex treating bath, and a vulcanized rubber tire carcass stock containing the resinous reaction product of a compound selected from the group consisting of 1-aza-3,7-dioxabicyclo[3.3.0]octane,
1-aza-5-methyl-3,7-dioxabicyclo[3.3.0]octane,
1-aza-5-ethyl-3,7-dioxabicyclo[3.3.0]octane,
1-aza-5-n-propyl-3,7-dioxabicyclo[3.3.0]octane,
1-aza-5-isopropyl-3,7-dioxabicyclo[3.3.0]octane,
1-aza-5-methylol-3,7-dioxabicyclo[3.3.0]octane,
1-aza-5-beta-hydroxyethyl-3,7-dioxabicyclo[3.3.0]octane,
1-aza-5-acetoxymethyl-3,7-dioxabicyclo[3.3.0]octane and
1-aza-5-methoxymethyl-3,7-dioxabicyclo[3.3.0]octane, and material selected from the group consisting of resorcinol, m-aminophenol, m-phenylenediamine, resorcinol monoacetate, resorcinol diacetate, 1,5-naphthalenediol and partially reacted resorcinol-formaldehyde resins.

12. A laminate of tire cord fabric containing the dried deposit of a rubber latex treating bath and a vulcanized rubber tire carcass stock containing the resinous reaction product of 1-aza-5-methylol-3,7-dioxabicyclo[3.3.0]octane and a partially reacted resorcinol-formaldehyde resin.

13. A solid vulcanizable rubber composition containing a compound selected from the group consisting of 1-aza-3,7-dioxabicyclo[3.3.0]octane,
1-aza-5-methyl-3,7-dioxabicyclo[3.3.0]octane,
1-aza-5-ethyl-3,7-dioxabicyclo[3.3.0]octane,
1-aza-5-n-propyl-3,7-dioxabicyclo[3.3.0]octane,
1-aza-5-isopropyl-3,7-dioxabicyclo[3.3.0]octane,
1-aza-5-methylol-3,7-dioxabicyclo[3.3.0]octane,
1-aza-5-beta-hydroxyethyl-3,7-dioxabicyclo[3.3.0]-octane,
1-aza-5-acetoxymethyl-3,7-dioxabicyclo[3.3.0]octane and
1-aza-5-methoxymethyl-3,7-dioxabicyclo[3.3.0]octane, and material selected from the group consisting of resorcinol, m-aminophenol, m-phenylenediamine, resorcinol monoacetate, resorcinol diacetate, 1,5-naphthalenediol and partially reacted resorcinol-formaldehyde resins.

14. A solid vulcanizable rubber composition containing 1-aza-5-methylol-3,7-dioxabicyclo[3.3.0]octane and a partially reacted resorcinol-formaldehyde resin.

References Cited by the Examiner

UNITED STATES PATENTS

| | | | |
|---|---|---|---|
| 2,363,465 | 11/1944 | Senkus | 260—307.6 |
| 2,448,890 | 9/1948 | Johnston | 260—307 |
| 2,631,961 | 3/1953 | Antheil | 260—845 |
| 2,902,398 | 9/1959 | Schroeder | 156—315 |
| 2,927,051 | 3/1960 | Buckwalter et al. | 161—241 |
| 2,951,058 | 8/1960 | Updegraff et al. | 260—59 |
| 3,031,431 | 4/1962 | Rye | 260—43 |
| 3,193,407 | 7/1965 | Keller et al. | 252—8.8 |
| 3,194,294 | 7/1965 | VanGils | 152—357 |

FOREIGN PATENTS

| | | |
|---|---|---|
| 715,618 | 9/1954 | Great Britain. |

EARL M. BERGERT, *Primary Examiner.*

C. B. COSBY, *Assistant Examiner.*

UNITED STATES PATENT OFFICE
CERTIFICATE OF CORRECTION

Patent No. 3,256,137  June 14, 1966

Arthur C. Danielson

It is hereby certified that error appears in the above numbered patent requiring correction and that the said Letters Patent should read as corrected below.

Column 9, line 64, for "3-" read -- 3, --; column 10, line 54, after "propyl-" insert -- 3, --.

Signed and sealed this 24th day of October 1967.

(SEAL)
Attest:

Edward M. Fletcher, Jr.  EDWARD J. BRENNER
Attesting Officer  Commissioner of Patents